(12) United States Patent
Lenz

(10) Patent No.: US 11,464,293 B2
(45) Date of Patent: Oct. 11, 2022

(54) METHOD AND APPARATUS FOR ADAPTING AN ITEM OF CLOTHING TO A PART OF THE BODY

(71) Applicant: LENZ GES.M.B.H., Schwarzach (AT)

(72) Inventor: Stefan Lenz, Schwarzach (AT)

(73) Assignee: LENZ GES.M.B.H., Schwarzach (AT)

( * ) Notice: Subject to any disclaimer, the term of this patent is extended or adjusted under 35 U.S.C. 154(b) by 582 days.

(21) Appl. No.: 16/069,526

(22) PCT Filed: Aug. 24, 2017

(86) PCT No.: PCT/EP2017/071323
§ 371 (c)(1),
(2) Date: Jul. 12, 2018

(87) PCT Pub. No.: WO2018/059842
PCT Pub. Date: Apr. 5, 2018

(65) Prior Publication Data
US 2019/0021448 A1 Jan. 24, 2019

(30) Foreign Application Priority Data

Sep. 27, 2016 (AT) .............................. A 50863/2016

(51) Int. Cl.
*A43D 1/02* (2006.01)
*A43D 35/00* (2006.01)
(Continued)

(52) U.S. Cl.
CPC .............. *A43D 1/022* (2013.01); *A41H 1/02* (2013.01); *A42B 3/10* (2013.01); *A42C 2/007* (2013.01);
(Continued)

(58) Field of Classification Search
None
See application file for complete search history.

(56) References Cited

U.S. PATENT DOCUMENTS 2,440,508 A 4/1948 Gould
3,458,898 A * 8/1969 Casparis ................ A43D 1/022
425/2

(Continued)

FOREIGN PATENT DOCUMENTS

DE 197 06 015 A1 8/1998
DE 10 2007 002 335 A1 7/2008
(Continued)

OTHER PUBLICATIONS

Office Action issued in Japanese Patent Application No. 2018-541412 dated Dec. 8, 2020 with English translation provided.
(Continued)

*Primary Examiner* — Michael P. Rodriguez
(74) *Attorney, Agent, or Firm* — Nixon & Vanderhye

(57) ABSTRACT

In a method for adapting a thermally deformable item of clothing to a body part, the item is at least partially heated and brought into contact with an abutment region and the appropriate body part. The item of clothing has a side which, in the use position, is directed towards the body and a side which, in the use position, is directed away from the body. At least one pressure-exerting unit subjects that side of the item of clothing which is directed away from the body, at least in part, to a shaping pressure such that the at least partially heated item of clothing is adapted, at least in part, to the shape of the part of the body. The item of clothing is at least partially cooled by a cooling unit such that it is stabilized in the shape adapted to the part of the body.

13 Claims, 2 Drawing Sheets

(51) Int. Cl.
- *A43B 7/28* (2006.01)
- *A43B 3/34* (2022.01)
- *A41H 1/02* (2006.01)
- *A42B 3/10* (2006.01)
- *A42C 2/00* (2006.01)
- *B29D 35/12* (2010.01)

(52) U.S. Cl.
CPC .................. *A43B 3/34* (2022.01); *A43B 7/28* (2013.01); *A43D 35/00* (2013.01); *B29D 35/122* (2013.01)

(56) References Cited

U.S. PATENT DOCUMENTS

| | | | | |
|---|---|---|---|---|
| 3,848,287 | A | * | 11/1974 | Simonsen ................ A43B 7/28 12/142 P |
| 5,891,545 | A | | 8/1999 | Delude |
| 7,657,054 | B2 | * | 2/2010 | Phillips .................. A43B 17/00 382/100 |
| 2010/0212183 | A1 | * | 8/2010 | Seliger ..................... A43B 7/28 36/2.6 |
| 2013/0074277 | A1 | * | 3/2013 | Luezlbauer .......... A43B 5/0427 12/128 R |

FOREIGN PATENT DOCUMENTS

| | | |
|---|---|---|
| EP | 0 276 580 A2 | 8/1988 |
| JP | 2014-108567 A | 6/2014 |
| JP | 2015-506778 A | 3/2015 |
| WO | 98/14082 A1 | 4/1998 |
| WO | 0204/112525 A1 | 12/2004 |
| WO | 2011/153567 A1 | 12/2011 |
| WO | 2014/015354 A1 | 1/2014 |

OTHER PUBLICATIONS

International Search Report, dated Jan. 12, 2017, from corresponding PCT/EP2017/071323 application.

AT Search Report, dated Mar. 3, 2017, from corresponding AT 50863/2016 application.

Office Action issued in Japanese Patent Application No. 2018-541412 dated Feb. 25, 2020 with English translation provided.

* cited by examiner

METHOD AND APPARATUS FOR ADAPTING AN ITEM OF CLOTHING TO A PART OF THE BODY

BACKGROUND OF THE INVENTION

Field of the Invention

The invention relates to a method for adapting a thermally deformable article of clothing to a body part, the article of clothing being heated at least in part and being brought into contact with a contact region and the corresponding body part, and the article of clothing having one side that faces the body in the position of use and one side that faces away from the body in the position of use.

Furthermore, the invention relates to a device for adapting at least one thermally deformable article of clothing that has been heated at least in part to one body part the device having a contact region for the article of clothing, the article of clothing having one side that faces the body in the position of use and one side that faces away from the body in the position of use.

Description of the Related Art

To adapt a thermally deformable sole to the sole of a foot, it is known that an individual without shoes climbs into a tank that is filled with sand or with a vacuum cushion that has styropor balls in order to leave a foot impression there. Subsequently, air is exhausted from the vacuum cushion optionally using a vacuum pump in order to stabilize the shape of the foot impression. A preheated sole is then placed on the foot impression, and the individual stands on the heated sole.

This method has several disadvantages. Heating in an oven takes a relatively long time since the sole must be heated to a high temperature. It is, for example, conventional for the sole to be heated at 120° C. for roughly 10 minutes in the oven. The individual then climbs onto a completely heated sole whose entire surface has a temperature of roughly 70° C. This temperature is often perceived as unpleasant.

Moreover, the individual must remain standing on the sole until the sole has cooled, since otherwise, the sole does not assume the exact shape of the sole of the individual's foot. Cooling likewise lasts a relatively long time, generally about 15 minutes.

DE 10 2007 002 335 A1 discloses that an inner shoe at least in one partial region consists of a thermoplastic deformable material, to which thermoplastic deformable region of the inner shoe an electrical heating element is assigned. In order to be able to adapt the inner shoe to the sole of the individual's foot, the individual climbs into a shoe that has the inner shoe. Subsequently, the thermoplastic deformable regions of the inner shoe are heated by the electrical heating element. For heating purposes, the electrical heating element is connected to a battery that is located on the inner shoe. There remains the disadvantage that the cooling takes a relatively long time. If the individual does not stay standing in the shoe until the inner shoe has cooled and its shape has stabilized but starts to walk in a not-yet-cooled state of the inner shoe, there is then the risk that the shape of the inner shoe will continue to change and it will not be adapted to the shape of the sole of the individual's foot.

SUMMARY OF THE INVENTION

The object of the invention is to make available a method and a device of the initially-named type with which adaptation of an article of clothing to a body part and cooling of the adapted article of clothing can be achieved as promptly and efficiently as possible, and the disadvantages of the prior art are to be for the most part avoided.

Preferred and advantageous embodiments of the invention are the subject matter of the dependent claims.

According to the invention, it is provided that a shaping or adaptation pressure is applied to the side of the article of clothing facing away from the body by at least one pressure application means at least in part such that the article of clothing that has been heated at least in part is adapted at least in part to the shape of the body part, and that the article of clothing is cooled at least in part by a cooling means such that it is stabilized in the shape adapted to the body part. For this purpose, a device according to the invention has at least one pressure application means that applies a shaping pressure at least in part to the side of the article of clothing heated at least in part, which side faces away from the body, such that the article of clothing can be adapted at least in part to the shape of the body part, the device having at least one cooling means for cooling the article of clothing at least in part. Thus, the article of clothing can be quickly heated, adapted or shaped and can be stabilized in the adapted shape, the individual not having to be in contact with an overly hot article of clothing for an overly long time.

Preferably, heat is supplied to the article of clothing that has at least regions of a thermoplastic resin or consists of the latter at least in part, before and/or while it is in contact with the contact area until it can be deformed. The thermoplastic resin, for this purpose, is heated at least in part to a temperature at which it assumes an aggregate thermoplastic state and can be deformed in a shape-stable manner or at which it becomes thermoplastically deformable, but which is below the temperature at which the plastic liquefies.

Within the scope of the invention, the article of clothing can, however, also be heated in part all over and can, however, also be cooled in part or all over.

It is especially favorable if heat is supplied to the article of clothing by an electrical heating element that is located in or on the article of clothing. In this way, the article of clothing can be made deformable very quickly and efficiently, for example within from 10 to 15 seconds, also the entire article of clothing and in particular the entire surface of the article of clothing not having to be heated. In this way, the side of the article of clothing with which an individual is in contact with one body part for adaptation or shaping can have a temperature that is not perceived as unpleasant or even painful.

It is especially advantageous if heat is supplied to the article of clothing by an electrical voltage being applied to contacts of a heating element that is located in and/or on the article of clothing. The contacts can be made, for example, as contact surfaces, as contact points or also as plug-in connections. For this purpose, the device can have correspondingly shaped mating contacts at corresponding points. An embodiment is also conceivable in which the voltage is transmitted via induction from the device to the heating element.

Within the scope of the invention, it is provided that the pressure application means is an elastically deformable the pressure application means, preferably a shaping cushion, which is located in the region of the contact area. The pressure application means can be, for example, internally hollow and can have an outer jacket of silicone or another elastic material. Preferably, the pressure application means is also used as a cooling means.

In one preferred embodiment of the method, a cooling liquid is routed from a, for example, compressible storage tank via a cooling line into the pressure application means that is acting as the cooling means. The pressure application means that is filled with cooling liquid is thus deformed elastically in the direction of the article of clothing that is located on the contact area, applying a shaping pressure to the side of the article of clothing that is facing away from the body. In doing so, the pressure application means can be in contact with the article of clothing only in part or can essentially completely surround it and apply the shaping pressure only in part or else a large area to the article of clothing. The article of clothing that has been made deformable by heating is forced by the shaping pressure against the corresponding body part and assumes a shape that corresponds to the body part. A cooling liquid is defined as a suitable cooling fluid.

It is especially preferred if heat is removed from the article of clothing during and/or after shaping by the cooling liquid that has been accommodated in the pressure application means, preferably so much heat being removed from the article of clothing in doing so that it can no longer be deformed and is stabilized in the shape adapted to the body part. After cooling of the article of clothing, the cooling liquid is returned to the storage tank from the pressure application means via the cooling line.

The cooling liquid used can be cooled in the storage tank to, for example, 5-10° C. before and/or during the method by means of a heat exchanger or in some other way.

Within the scope of the invention, one embodiment in particular is preferred in which the cooling liquid is routed by a pump, preferably an electrical pump, or a pressure cylinder out of the storage tank into the pressure application means and is returned from the pressure application means to the storage tank, preferably at least one pressure sensor being used in the cooling line between the pressure application means and the pump or the pressure cylinder. The use of a pump within the scope of the invention is especially preferred since this is structurally easy to implement and can be controlled especially well.

In one alternative embodiment of the method according to the invention, the pressure that has been applied to the side of the article of clothing facing the body can be transferred via an energy storage mechanism that is located in particular in the region of the contact area, preferably a spring, to the compressible storage tank that is filled with cooling liquid, in the cooling line there being a valve, in particular a solenoid valve.

In one such alternative embodiment, the cooling line proceeding from the storage tank is preferably closed by the valve in an initial state of the storage tank so that a flow of cooling liquid from the storage tank into the cooling line and compression of the storage tank are prevented. The valve is opened for adapting or shaping and cooling of the article of clothing so that the storage tank is being compressed by the transferred pressure, and cooling liquid flows through the valve via the cooling line into the pressure application means that is located in the region of the contact area.

It is especially preferred if the cooling liquid, after cooling of the article of clothing, i.e., when pressure is no longer being applied to the contact area, flows back out of the pressure application means via the cooling line and the valve into the storage tank, the pressure application means and the storage tank being returned to the respective initial state, and if the cooling line proceeding from the storage tank is being closed by the valve.

In the method according to the invention, the article of clothing can be a sole, in particular an inner sole for a shoe, a protector, for example a shin guard, an elbow guard, a knee guard, an upper arm guard or a back guard, or a helmet or a liner for a helmet.

Within the scope of the invention, it can be provided that at the start and/or during and/or at the end of at least one method step, in particular of adaptation or shaping, an optical and/or acoustic signal is output by a suitable signaling means.

The method can be monitored, supported, optimized and/or controlled in segments or continuously by a control, for example a computer control.

A device for executing the method according to the invention can have several contact areas, pressure application means, cooling means and/or storage tanks, so that several articles of clothing can be adapted at the same time, preferably to several similarly-shaped body parts of an individual, such as, for example, the soles of the feet.

An operating sequence of the method according to the invention can be summarized as follows using the example of an inner sole for a shoe:

In a first method step, a sole that can be thermally deformed at least in part is placed in a base mold on a contact area. In doing so, an elastic pressure application means at least in part surrounds one segment of the bottom and segments of the narrow sides of the sole in a middle region of the sole.

Then, one foot is placed on the surface of the sole, by which pressure is applied to the sole. The position or location of the sole and/or of the foot in the base mold can be determined using a laser sensor and can optionally be corrected using a size adjuster. The distance of the base molds to one another can be changed, if necessary, via positioning motors.

In a next method step, a heating element that is located in or on the sole is heated by applying electrical voltage. The voltage that is necessary for this purpose is transmitted via corresponding mating contacts that are connected to the contacts of the heating element and that are located on the base mold. This heating process is ended as soon as the sole has been heated long enough to pass into a thermoelastic state. Reaching the temperature necessary for this purpose can be signaled via LEDs or other signaling means.

In a next method step, the shaping process, cooling liquid is pumped out of a storage tank via a cooling line, for example by means of a pump, into the elastic pressure application means. The latter thereupon expands, applies a shaping pressure to the bottom and the narrow sides in the middle region of the sole, and adapts, presses or shapes the sole to the sole of the foot standing on it, in particular in the region of the metatarsus or transverse arch of the sole of the foot. The intensity of the shaping pressure or of the cooling line pressure can be determined via a pressure sensor that is located in the cooling line and can be regulated by the pump.

At the same time, the pressure application means also acts as a cooling means, since it removes heat from the sole during the shaping process by the cooling liquid that has been pumped into the pressure application means. The thermally deformable regions of the sole thus cool, and the sole passes into a state of stable shape, its maintaining the shape that was assumed beforehand and that corresponds to the shape of the sole of the foot.

Then, the cooling liquid can be pumped back again into the storage tank, the foot removed from the sole, and the fully-shaped sole adapted to the sole of the foot can be removed from the base mold.

In one alternative embodiment of the method according to the invention by means of one alternative embodiment of the device according to the invention, a pump is not needed to fill the pressure application means with cooling liquid. For this purpose, in this alternative embodiment between the contact area and the compressible storage tank for cooling liquid, there is an energy storage mechanism, preferably a spring, and the cooling line has a valve, preferably a solenoid valve.

In a first method step of the alternative embodiment, the pressure applied by the foot to the sole is transferred to the energy storage mechanism. Since, in this first method step, the valve is closed, the storage tank cannot be compressed due to the essentially incompressible cooling liquid that is contained in it. The energy storage mechanism therefore stores the accommodated pressure, for example in the form of deformation energy.

If the sole that can be thermally deformed at least in part is heated to a temperature at which it can be deformed at least in part, in a next method step, the valve is opened, and subsequently, the storage tank is compressed by the pressure released from the energy storage mechanism. The cooling liquid that has been accommodated in the storage tank is forced out of the storage tank through the cooling line into the pressure application means.

The shaping process that has been initiated in this way proceeds as in the above-described embodiment of the method, with the difference that the storage tank independently expands again after the foot is removed from the sole, and in this way, the pressure applied to the sole is also removed, as a result of which the cooling liquid flows or is sucked out of the pressure application means through the cooling lines back into the storage tank.

BRIEF DESCRIPTION OF THE DRAWINGS

Other details, features and advantages of the invention will become apparent from the following description with reference to the attached drawings, in which preferred embodiments are shown. Here.

DESCRIPTION OF THE PREFERRED EMBODIMENTS

Figure 1:
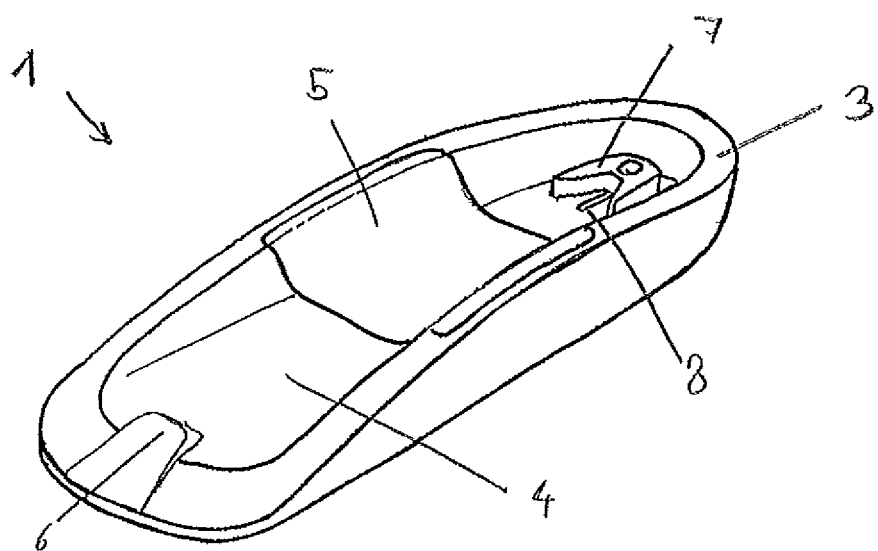
FIG. 1 shows an isometric view of one part of the device according to the invention for adapting a sole.

FIG. 1 shows a view of a base mold 3 that is to be used in a device 1 according to the invention for adapting a sole 2 to a sole of a foot. The base mold 3 has a contact area 4 for adjoining the sole 2 that is not shown in FIG. 1. The sole 2 encompasses a bottom that faces away from the sole of the foot, a top that faces the sole of the foot, and narrow sides, and has a forward toe area, a middle area and a rear ankle area.

On the base mold 3, in the contact area 4, there is a fillable silicone cushion as the pressure application means 5, which with the sole 2 in place is assigned to the bottom and the narrow sides of the sole 2 in place in the middle area.

In the region of the toe area of the sole 2 in place, on the base mold 3 there is a laser sensor 6 with which the location of a foot that has been placed on the top of the sole 2 in place and by which pressure is applied to the sole 2 can be monitored or measured in order to be able to correct the latter if necessary.

In the region of the ankle area of the sole 2 in place, on the base mold 3 there is a size adjuster 7 with which the position of the sole 2 in place can be adjusted or shifted in the longitudinal direction of the base mold 3. Furthermore, on the base mold 3 in the region of the ankle area of the sole 2 in place, there are electrical mating contacts 8 that correspond to contacts 9 of a heating element 11 located on or in the sole 2. Within the scope of the invention, these mating contacts 8 can be located in any region of the base mold 3 depending on the location of the corresponding contacts 9 of the sole 2.

Figure 2:
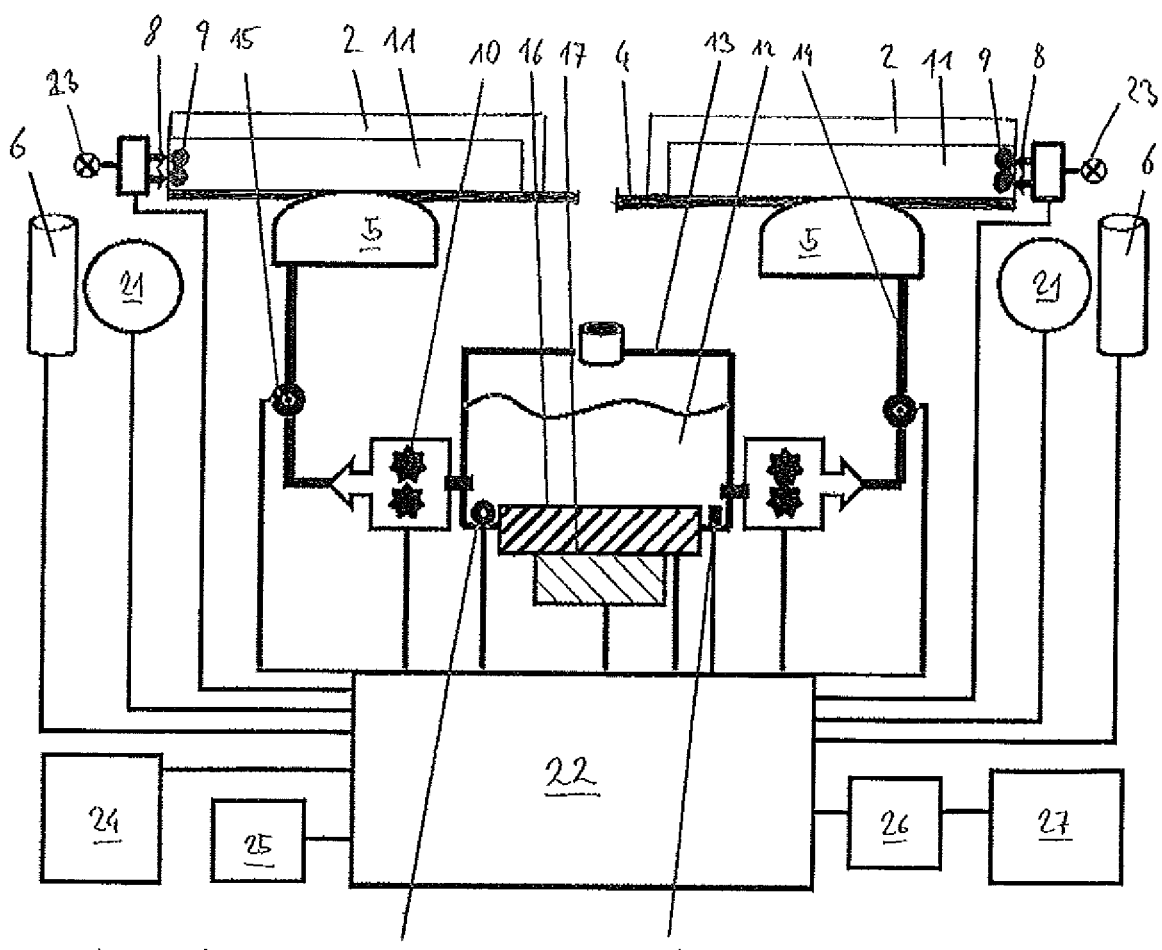
FIG. 2 shows a schematic view of one embodiment of a device according to the invention for adapting soles.

FIG. 2 shows the shaping process of the method according to the invention for soles 2 with a device 1 according to the invention that is suitable for this purpose. The device 1 encompasses two base molds 3 that are located next to one another, so that soles 2 for the two feet of one individual can be shaped at the same time.

Each of the heated and thus deformable soles 2 in the device 1 according to the invention adjoins the respective contact area 4 and is forced or shaped by one of the pressure application means 5 against the sole of a foot that is not shown and that rests on the sole. Each sole 2 is heated via the heating elements 11 to whose contacts 9 electrical voltage is applied via corresponding mating contacts 8 that are located on the base molds 3.

A single storage tank 13 that is filled with cooling liquid 12 is assigned to the two contact areas 4. So that the elastic pressure application means 5 that are unexpanded in an initial state are expanded and apply a shaping pressure to the soles 2, the cooling liquid 12 that in the initial state is stored in the storage tank 13 is pumped into the pressure application means 5 via cooling lines 14 by pumps 10 during the shaping process. Pressure sensors 15 that are located in or on the cooling lines 14 can measure the pressure in the cooling lines 14 and thus also in the pressure application means 5.

During the shaping process, the cooling liquid 12 that has been pumped into the pressure application means 5 removes heat from the soles 2, as a result of which those areas of the sole that consist of thermoplastic resin pass into a state of stable shape and retain the shape of the sole of the foot. The pressure application means 5 thus also acts as cooling means.

The cooling liquid 12 in the storage tank 13 can be cooled to a temperature that is favorable for the method according to the invention, for example to less than 10° C., by a heat exchanger or a Peltier element 16 with a fan 17 located thereon. A temperature sensor 18 that is located on or in the storage tank 13 and a level sensor 19 make it possible to monitor the temperature and level of the cooling liquid 12 in the storage tank 13 before, during and/or after the process.

The distance of the base molds 3 to one another can be changed by the positioning motors 21 shown in FIG. 2 in order to counteract, for example, faulty positions of the feet that have been placed on the soles 2.

A control 22 is connected to some or all electrical and electronic components of the device 1, such as pumps 10, mating contacts 8, pressure sensors 15, laser sensors 6, positioning motors 21, Peltier element 16, fan 17, temperature sensor 18 and level sensor 19 in order to control and/or monitor them before, during and/or after the process.

The device 1, as shown in FIG. 2, has LEDs 23 that are used as optical indicating means in order to signal, for example, that the soles 2 have been heated by the heating elements 11 to a temperature that is suited to the method according to the invention or to the shaping process. Other optical and/or acoustic indicating elements 24 that are not depicted can be connected to the control 22, in the same manner as an interaction interface 25, via which the control 22 can be operated or monitored.

The control 22 is connected via a switch 26 to a power supply 27, for example a power pack that is connected to the network.

A device 1 for adaptation of an article of clothing 2 that is different from a sole 2, such as, for example, a shin guard or a helmet, has a structure that is suited to the device 1 according to FIG. 2. The contact area 4, however, can have an alignment other than horizontal, depending on the body part that is to be adapted. To adapt a shin guard to a shin, the contact area can be aligned, for example, essentially vertically, and for adaptation of a helmet to a head, the contact area can be located, for example, completely rotated, so that an individual with the head from below is in contact with the article of clothing located under the contact area.

Figure 3:
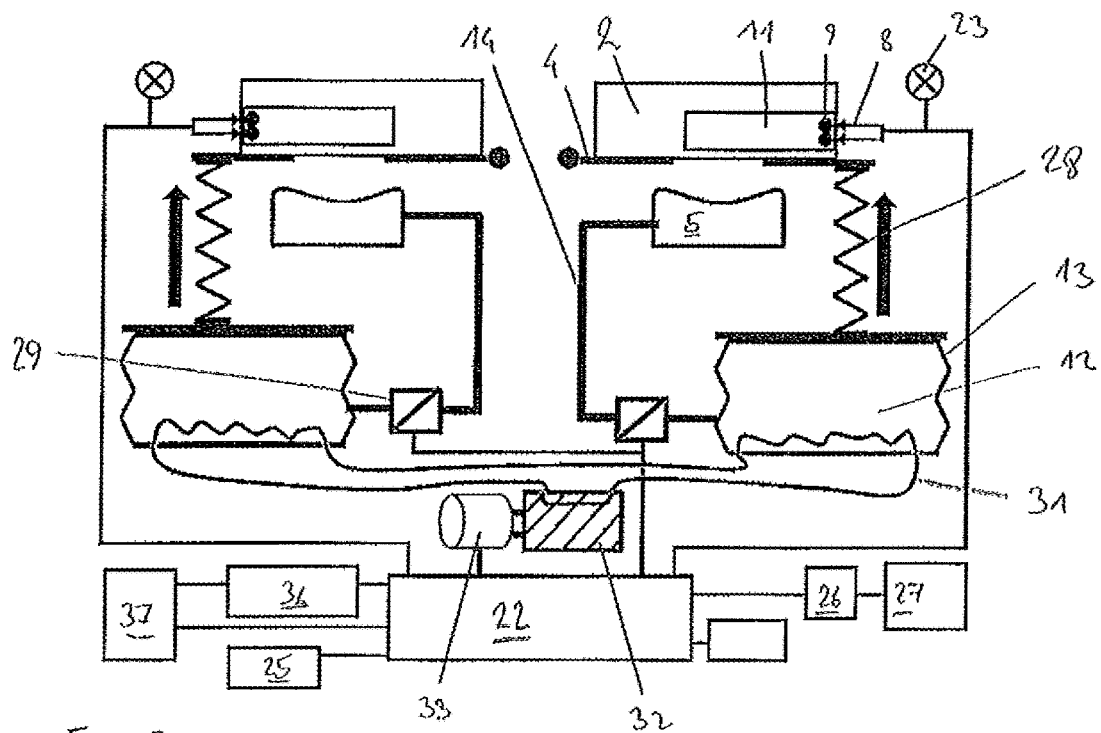
FIG. 3 shows a schematic view of one alternative embodiment of the device according to the invention for adaptation of soles in a first method step.
Figure 4:
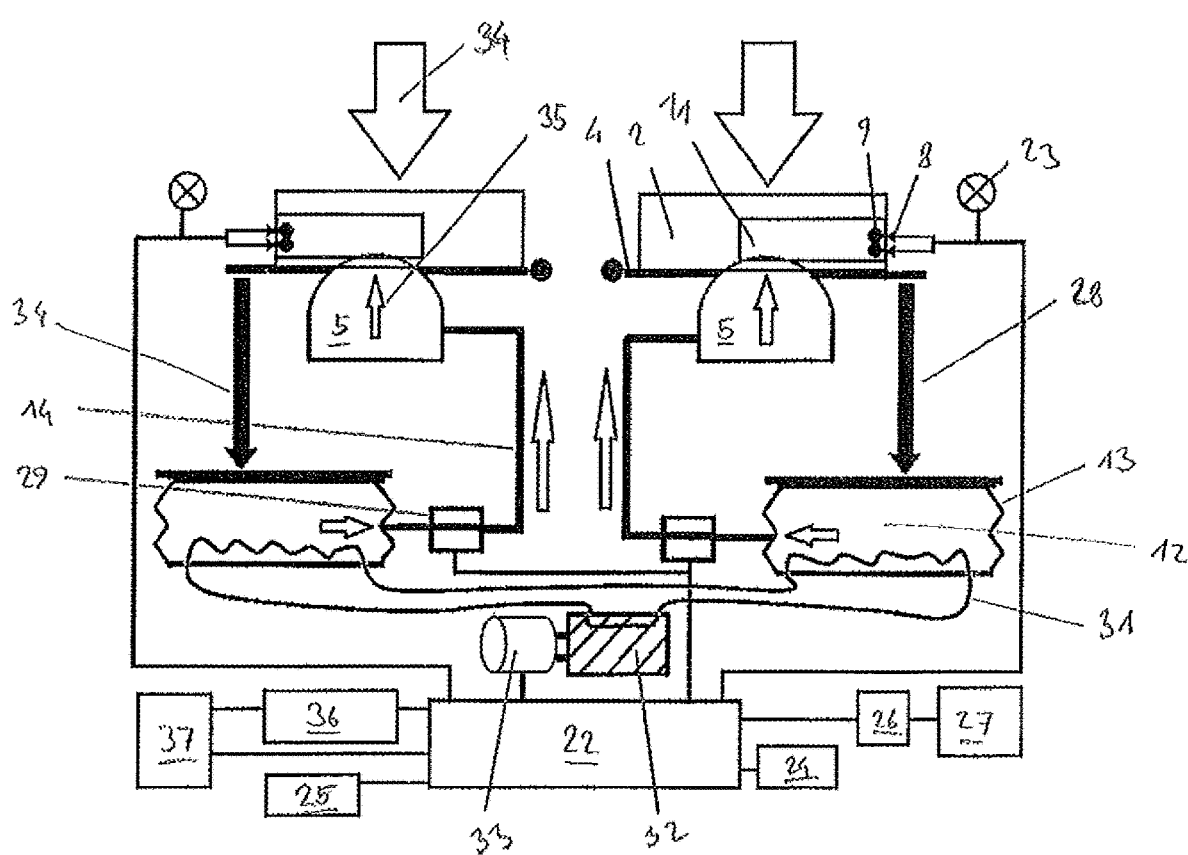
FIG. 4 shows a schematic view of the alternative embodiment of the device according to the invention for adaptation of soles in another method step.

FIGS. 3 and 4 show an alternative embodiment of the device 1 according to the invention for adapting soles 2 with two base molds 3, so that the soles 2 can be shaped at the same time for both feet.

FIG. 3 shows an initial state of the device 1. Each of the soles 2 adjoins the respective contact area 4, the heating element 11 located in or on the respective sole 2 being connected via the contacts 9 to mating contacts 8 on the base molds 3.

The pressure application means 5 are unexpanded and are connected via cooling lines 14 to compressible storage tanks 13 that are filled with cooling liquid 12. One storage tank 13 at a time is assigned to each contact area 4. In the cooling lines 14 or between the storage tanks 13 and the cooling lines 14, there are valves 29, preferably solenoid valves connected to the control 22, the valves 29 being closed in the initial state so that the storage tanks 13 cannot be compressed based on the essentially incompressible cooling liquid 12 contained in them.

The cooling liquid 12 in the storage tanks 13 is cooled to a temperature favorable to the method, for example roughly 5° C., via a secondary circuit 31 with a heat exchanger 32, which is connected to a compressor 33 that is controlled by the control 22.

During or after the described initial state, the soles 2 are heated by the heating elements 11, so that they can be deformed, in particular by those regions of the sole 2 that consist of thermoplastic resin, assuming a thermoelastic state. Reaching the temperature required for this purpose is signaled via optical signaling means, such as LEDs 23.

During or after the initial state, an individual climbs onto the soles 2, so that pressure 34 is applied to each of the soles 2. The pressure 34 is transferred from each sole 2 to the pertinent contact area 4 and from the latter in each case to one energy storage mechanism 28, preferably a spring, which is connected to the respective compressible storage tank 13.

Since the storage tanks 13 in the initial state cannot be compressed, the pressure 34 that has been applied to the respective energy storage mechanism 28 is stored in the energy storage mechanism 28, for example in the form of deformation energy.

FIG. 4 shows the device according to the invention during a shaping process. The valves 29 are opened by the control 22, as a result of which the energy storage mechanisms 28 release the respective pressure 34 to the storage tanks 13, the latter are compressed, and the cooling liquid 12 that is accommodated in the storage tanks 13 is forced through the cooling lines 14 into the pressure application means 5. In this way, the pressure application means 5 expand, apply a shaping pressure 35 to the bottom and the narrow sides in the middle region of the respective sole 2, and force or shape the respective sole 2 against the sole of the foot.

In the same process step, the cooling liquid 12 accommodated in the pressure application means 5 removes heat from the soles 2, as a result of which the regions of the soles consisting of thermoplastic resin pass into a state of stable shape, and the shape of the sole of the foot is retained. In this embodiment, the pressure application means 5 also acts at the same time as a cooling means. The use of other or supplementary cooling means, however, would be conceivable in all embodiments of the device according to the invention and all embodiments of the method according to the invention.

After the foot and thus also the pressure 34 are removed from each sole 2, the energy storage mechanisms 28 no longer transfer pressure 34 to the storage tanks 13, as a result of which they expand and again assume the same shape as in the initial state. The cooling liquid 12 is thus sucked back into the storage tanks 13 out of the pressure application means 5 via the cooling lines 14, whereupon the valves 29 are closed again. Subsequently or at the same time, the finished soles 2 of stable shape can be removed from the contact area 4.

As in the device 1 shown in FIG. 2, the control 22 is connected to a power supply 27 via a switch 26. Likewise, the control 22 has an interaction interface 25, and is connected to an indicating device 36, in particular a display, and one or more input device(s) 37, such as, for example, a keyboard. Other optical and/or acoustic indicating elements 24 can likewise be connected to the control 22 and can be monitored or controlled by the latter.

The invention claimed is:

1. A method for adapting a thermally deformable inner sole (2) of a shoe to a sole of a foot, wherein the inner sole (2) has an upper side that faces the body in a position of use and a bottom side that faces away from the body in the position of use, the method comprising:
    bringing the bottom side of the inner sole (2) into contact with a contact region (4) and bringing the upper side of the inner sole (2) into contact with the corresponding sole of the foot to which the inner sole (2) is to be adapted to by placing the foot on the surface of the inner sole (2);
    with the inner sole (2) in contact with the corresponding sole of the foot, using an electrical heating element that is located in or on the inner sole (2) to heat the inner sole (2) at least in part and applying a shaping pressure (35) to the bottom side of the inner sole (2) by at least one pressure application means (5) which is at least in part in such a way that the inner sole (2) that has been heated at least in part is adapted at least in part to a shape of the corresponding sole of the foot; and
    cooling the inner sole (2) at least in part by a cooling means, such that the inner sole (2) is stabilized in the shape adapted to the corresponding sole of the foot.

2. The method according to claim 1, wherein heat is supplied to the inner sole (2) until the inner sole (2) becomes deformable in a region of the corresponding sole of the foot by the electrical heating element heating the inner sole (2) at least in part, with the sole of the foot having been brought into contact with the inner sole (2), into a thermoelastic state.

3. The method according to claim 1, wherein the electrical heating element (11) is located in the inner sole (2) and the heat is supplied to the inner sole (2) by the electrical heating element (11) that is located in the inner sole (2) until a heated portion of the inner sole (2) passes into a thermoelastic state.

4. The method according to claim 1, wherein the pressure application means (5) is an elastically deformable pressure application means (5), and wherein the pressure application means (5) is used as the cooling means.

5. The method according to claim 4, wherein a cooling liquid (12) is routed out of a storage tank (13) via a cooling line (14) into the pressure application means (5) that is acting as cooling means.

6. The method according to claim 5, wherein the pressure application means (5) is filled with the cooling liquid (12), so that the pressure application means (5) is elastically deformed, and wherein the deformed pressure application means (5) at least in part applies the shaping pressure (35) to the bottom side of the inner sole (2) facing away from the body.

7. The method according to claim 5, wherein after cooling of the inner sole (2), the cooling liquid (12) is routed into the storage tank (13) from the pressure application means (5) via the cooling line (14).

8. The method according to claim 5, wherein the cooling liquid (12) is routed by a pump (10) or a pressure cylinder out of the storage tank (13) into the pressure application means (5) and out of the pressure application means (5) into the storage tank (13), at least one pressure sensor (15) being used in the cooling line (14) between the pump (10) or the pressure cylinder and the pressure application means (5).

9. The method according to claim 5, wherein pressure (34) is applied to the contact region (4), to the upper side of the inner sole (2) facing the body, and wherein the pressure (34) is transferred to the storage tank (13) that is filled with the cooling liquid (12), wherein the storage tank (13) is compressible.

10. The method according to claim 9, wherein the pressure (34) is transferred to the storage tank (13) via an energy storage mechanism (28) located in the region of the contact region (4), whereby in the cooling line (14), a valve (29) is used.

11. The method according to claim 10, wherein the cooling line (14) in an initial state of the storage tank (13) is closed by the valve (29), so that a flow of the cooling liquid (12) from the storage tank (13) into the cooling line (14) and compression of the storage tank (13) are prevented, and wherein the valve (29) is opened for adapting and cooling of the inner sole (2), so that the storage tank (13) is compressed and the cooling liquid (12) flows into the pressure application means (5).

12. The method according to claim 10, wherein the cooling liquid (12), after cooling of the inner sole (2), when pressure (34) is no longer being applied to the contact region (4), flows back out of the pressure application means (5) into the storage tank (13), the pressure application means (5) and the storage tank (13) being returned to the respective initial state, and wherein the cooling line (14) is closed by the valve (29).

13. The method according to claim 1,
wherein the electrical heating element is located in the inner sole (2) to heat the inner sole (2) and includes first electrical contacts (9),
wherein the contact region (4) is part of a base mold (3) which further includes a cushion that comprises the pressure application means (5) and second electrical contacts (8) that, upon bringing the bottom side of the inner sole (2) into contact with the contact region (4), mate with the first electrical contacts (9) of the inner sole (2) to power the electrical heating element located in the inner sole (2) to heat the inner sole (2), and
wherein heat is supplied to the inner sole (2) until the inner sole (2) becomes deformable in a region of the corresponding sole of the foot by the electrical heating element heating the inner sole (2), with the sole of the foot being in contact with the upper side of the inner sole (2), into a thermoelastic state.

\* \* \* \* \*